United States Patent
Barnes et al.

(10) Patent No.: US 7,383,404 B2
(45) Date of Patent: Jun. 3, 2008

(54) PRIORITY INITIALIZATION SYSTEM

(75) Inventors: Jeffery M. Barnes, Tucson, AZ (US);
Susan K. Candelaria, Tucson, AZ (US); Nicholas D. Fifer, Tucson, AZ (US); Matthew J. Kalos, Tucson, AZ (US); Edwin K. Scott, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/050,545

(22) Filed: Feb. 3, 2005

(65) Prior Publication Data

US 2006/0174073 A1    Aug. 3, 2006

(51) Int. Cl.
*G06F 12/00* (2006.01)
*G06F 13/00* (2006.01)
*G06F 13/28* (2006.01)
*G06F 15/16* (2006.01)
*G06F 9/00* (2006.01)
*G06F 9/24* (2006.01)
*G06F 15/177* (2006.01)

(52) U.S. Cl. .................. 711/158; 711/112; 711/151; 709/222; 709/224; 713/1; 713/2

(58) Field of Classification Search ............. 711/144, 711/158
See application file for complete search history.

(56) References Cited

U.S. PATENT DOCUMENTS

| 6,467,023 | B1 * | 10/2002 | DeKoning et al. | 711/114 |
| 6,513,114 | B1 * | 1/2003 | Wu et al. | 713/2 |
| 6,820,157 | B1 * | 11/2004 | Eide et al. | 710/303 |
| 7,062,644 | B2 * | 6/2006 | Bish et al. | 713/1 |
| 2003/0046490 | A1 * | 3/2003 | Busser et al. | 711/114 |

* cited by examiner

*Primary Examiner*—Donald Sparks
*Assistant Examiner*—Ryan Bertram
(74) *Attorney, Agent, or Firm*—Quarles & Brady LLP

(57) ABSTRACT

A computer storage system includes a supervisor algorithm to detect a host computer's initiator logging in. The supervisor algorithm identifies data storage devices associated with the newly logged-on initiator and tags logical unit number control blocks ("LUNCBs") as having priority in an initiation process. The supervisor algorithm assigns a task control block to each of the identified data storage devices and invokes a logical unit number ("LUN") initialization algorithm. If the supervisor algorithm was invoked during an initial microcode load ("IML") event, the LUN initialization algorithm initializes each of the identified data storage devices. However, if the supervisor algorithm was invoked during a warmstart procedure, the LUN initialization algorithm first checks to make sure the LUNCB was not mistakenly written too. If not, the LUN initialization algorithm terminates without initializing the associated data storage device. Otherwise, the associated data storage device is initialized and the LUN initialization algorithm terminates.

18 Claims, 4 Drawing Sheets

PRIORITY INITIALIZATION SYSTEM

BACKGROUND OF THE INVENTION

1. Field of the Invention

This invention is related in general to the field of data storage systems. In particular, the invention consists of a method for initializing data storage devices.

2. Description of the Prior Art

In FIG. 1, a computer storage system 10 includes host servers ("hosts") 12, data processing servers 14, data storage systems 16 such as redundant arrays of inexpensive/independent disks ("RAIDs"), and a data communication system 18. Requests for information traditionally originate with the hosts 12, are transmitted by the communication system 18, and are processed by the data processing servers 14. The data processing servers retrieve data from the data storage devices 20 over a second data communication system 22 and transmit the data back to the hosts 12 through the first communication system 18. Similarly, the hosts 12 may write data the to the data storage systems 16. The Data Processing Server 14 may include an individual computing device or a cluster of computer processors 24.

The communication system 18 may be a communication bus, a point-to-point network, a fiber channel-arbitrated loop, or other communication scheme. In a small computer systems interface ("SCSI") communication scheme, the hosts 12 include initiators 26 and the data storage devices 20 are logical units referred to as open devices. These logical units may be hard disk drives, tape cartridges, magneto-optical devices, or other memory devices.

In this exemplary computer storage system 10, each open device 20 includes a metadata track containing virtual product data, formatting status, and persistent reservation information. During a boot process, the data processing server 14 performs an initial microcode load ("IML") that includes initializing each open device 20 and loading metadata information into logical unit control blocks 28 ("LUNCB") to expedite the selection process of open devices. Each LUNCB controls access to its corresponding open device, only allowing one initiator 26 to access the device at a time. As the number of open devices increases, the time required for the IML also increases and quickly becomes prohibitive. Accordingly, it is desirable to allow the IML to complete prior to all the data storage devices being properly staged, i.e., copying the metadata information to the corresponding LUNCB 28.

One approach is to delay copying the metadata information for each device 20 until the device is first selected by an initiator 26. However, the first input/output request to the device would be delayed by the time necessary to copy the data to the LUNCB 28. Another solution is to run a background task that would methodically stage each device. However, this approach also leads to requests from initiators for devices that have not been properly staged. Either way, a significant delay is introduced into the data communication process. Accordingly, it is desirable to have a system of staging the data storage devices 20 using a priority scheme that reduces the number of requests for devices that have not yet been staged and reduces the associated delay.

SUMMARY OF THE INVENTION

The invention disclosed herein utilizes a method of initializing open devices 20 that gives priority to those devices which are associated with active initiators 26. An active background task detects when initiators log in to the system, identifies open devices 20 associated with the newly logged-in initiator. Because communication with the corresponding open devices is eminent, the corresponding open devices are tagged as requiring priority initialization.

A logical unit number ("LUN") initialization supervisor algorithm ("Supervisor") is maintained on a low-priority queue to periodically check for new work. Whenever a request for an non-initialized device is detected, the Supervisor is moved to a high-priority queue. When the Supervisor is granted processing time, it dispatches a LUN initialization task. This task begins by searching a free LUN initialization queue for an unused task control block ("TCB"). If a free TCB is found, the TCB is moved to an active LUN initialization queue. Once the TCB reaches the front of the active LUN initialization queue, it is placed in the high priority dispatch queue awaiting processing time. Once the TCB reaches the front of the high priority dispatch queue, the TCB performs the work of initializing the desired open device 20.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a logical unit number ("LUN") initialization supervisor algorithm ("supervisor algorithm") to detect initiators that are logging on a computer storage system, to identify open devices associated with newly logged-on initiator, and to dispatch an initialization task that gives the associated open devices priority in the initiation process. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 2:
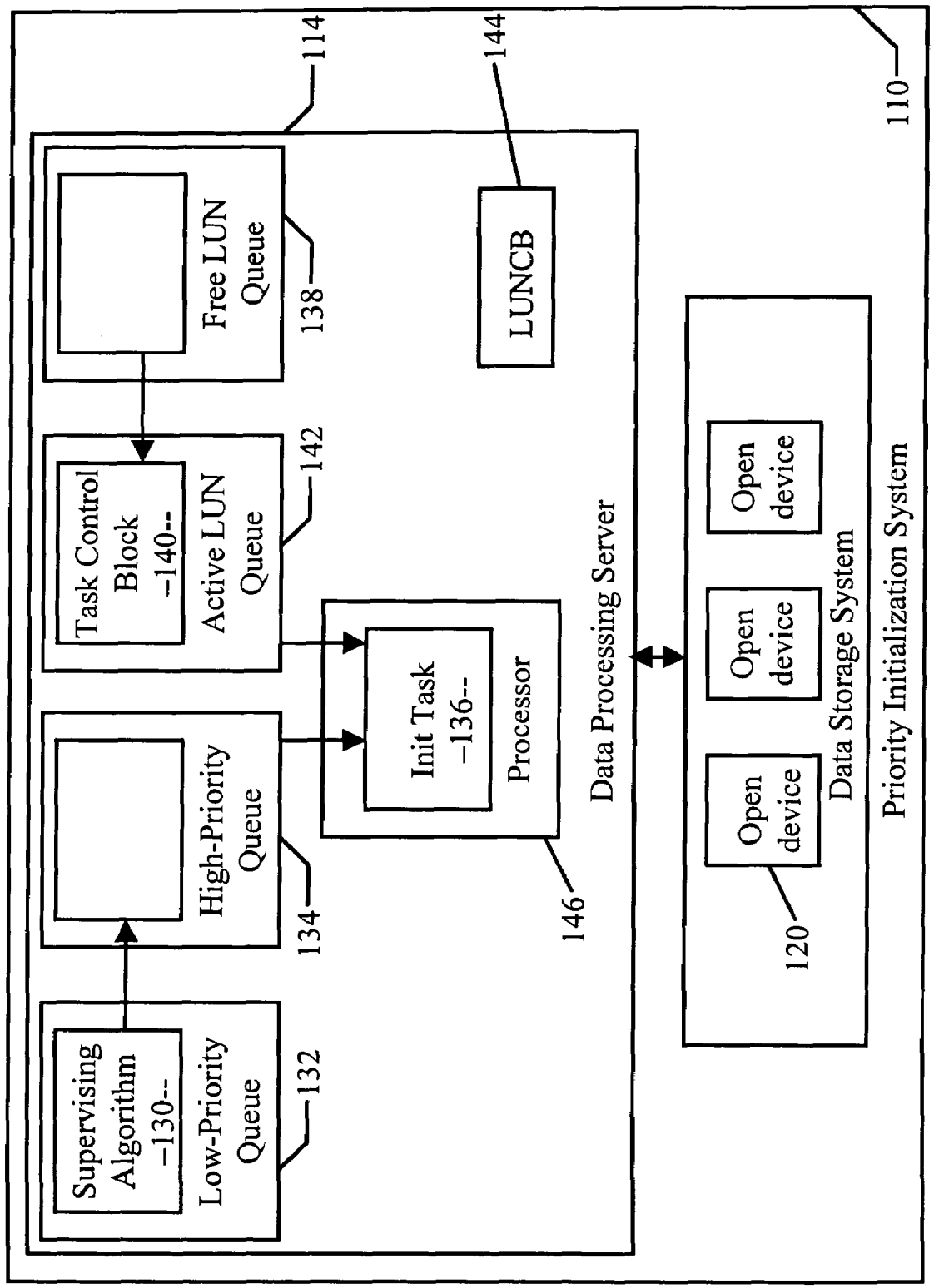
FIG. 2 is a block diagram illustrating a priority initialization system including a data processing server and a plurality of open devices according to the invention.

Referring to figures, wherein like parts are designated with the same reference numerals and symbols, FIG. 2 is a block diagram illustrating a priority initialization system 110 including a data processing server 114 and a plurality of open devices 120.

During initial microcode load ("IML") or during a recovery initiated by an error condition ("warmstart"), several initialization steps must be done in order to prepare an open device 120. These steps include (a) initializing and validating the LUN control block ("LUNCB") 144, (b) reading metadata 146 to determine mode page settings, format settings, and persistent reservation information, and (c) initializing autoformat if the open device has not yet been formatted.

A supervisor algorithm 130 resides on a low-priority queue 132 so that it may have periodic access to the processor 146 so that it may periodically check for new work. This processor 146 may be a complex programmable logic device ("CPLD"), a field-programmable gate array ("FPGA"), application-specific integrated circuit ("ASIC"), microprocessor, or other programmable logic device. Whenever a request for an non-initialized device is detected, the Supervisor is moved to a high-priority queue 134. This queue is similar to the low-priority queue 132 but is given priority with regard to access to the processor 146.

Figure 1:
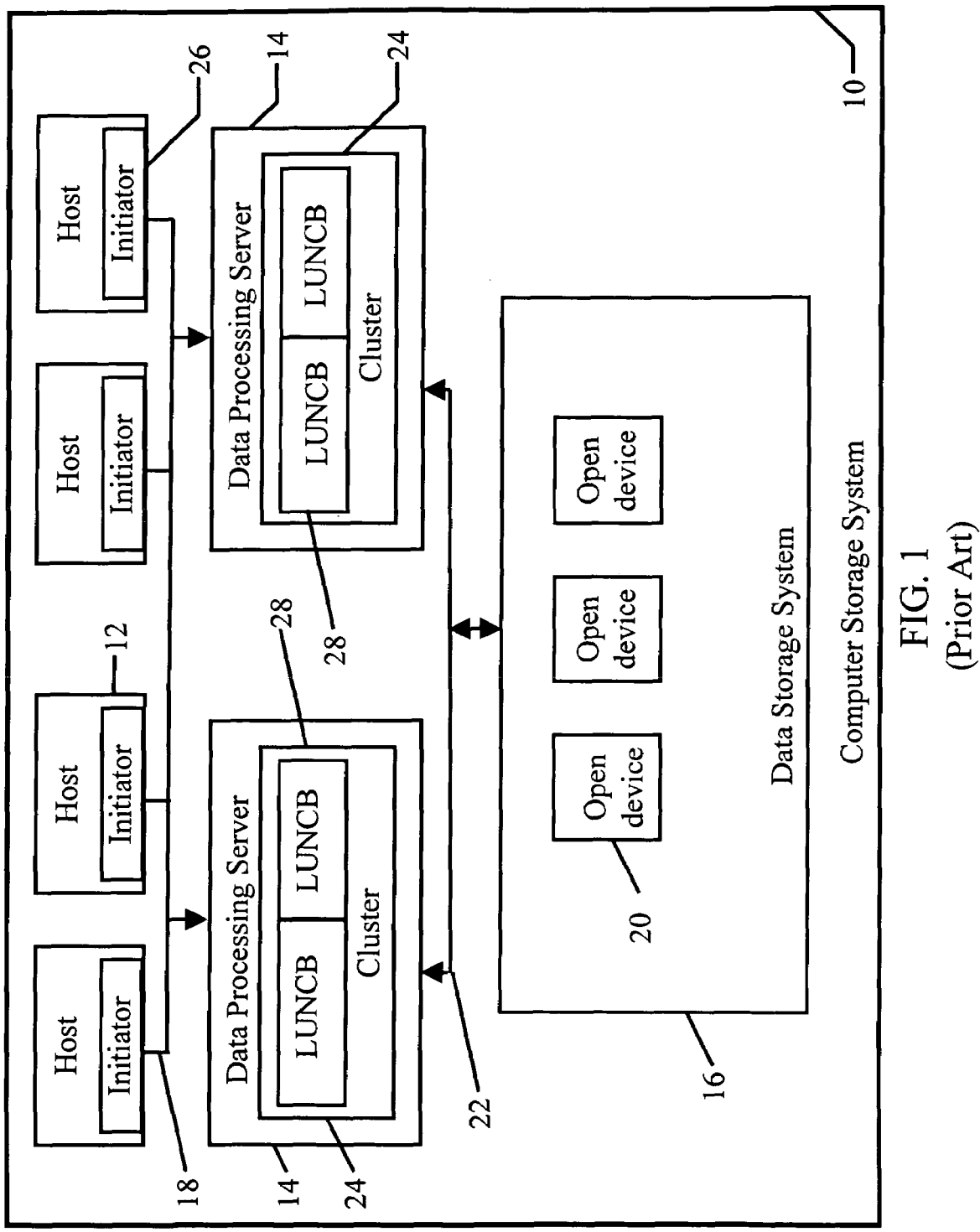
FIG. 1 is a block diagram illustrating a computer storage system including host servers, data processing servers, data storage devices, and a data communication system.

When the Supervisor algorithm is granted processing time, it dispatches a LUN initialization task 136 ("init task"). This init task begins by searching a free LUN initialization queue ("free init queue") 138 for an unused task control block ("TCB") 140. If a free TCB is found, the TCB 140 is moved to an active LUN initialization queue ("active init queue") 142. Once the TCB reaches the front of the active init queue, it is placed in the high priority queue 134 awaiting processing time. Once the TCB 140 reaches the front of the high priority queue, the TCB performs the work of initializing the desired open devices 20. Alternatively, the init task 136 may be invoked from a HOST (FIG. 1) command.

Figure 3:
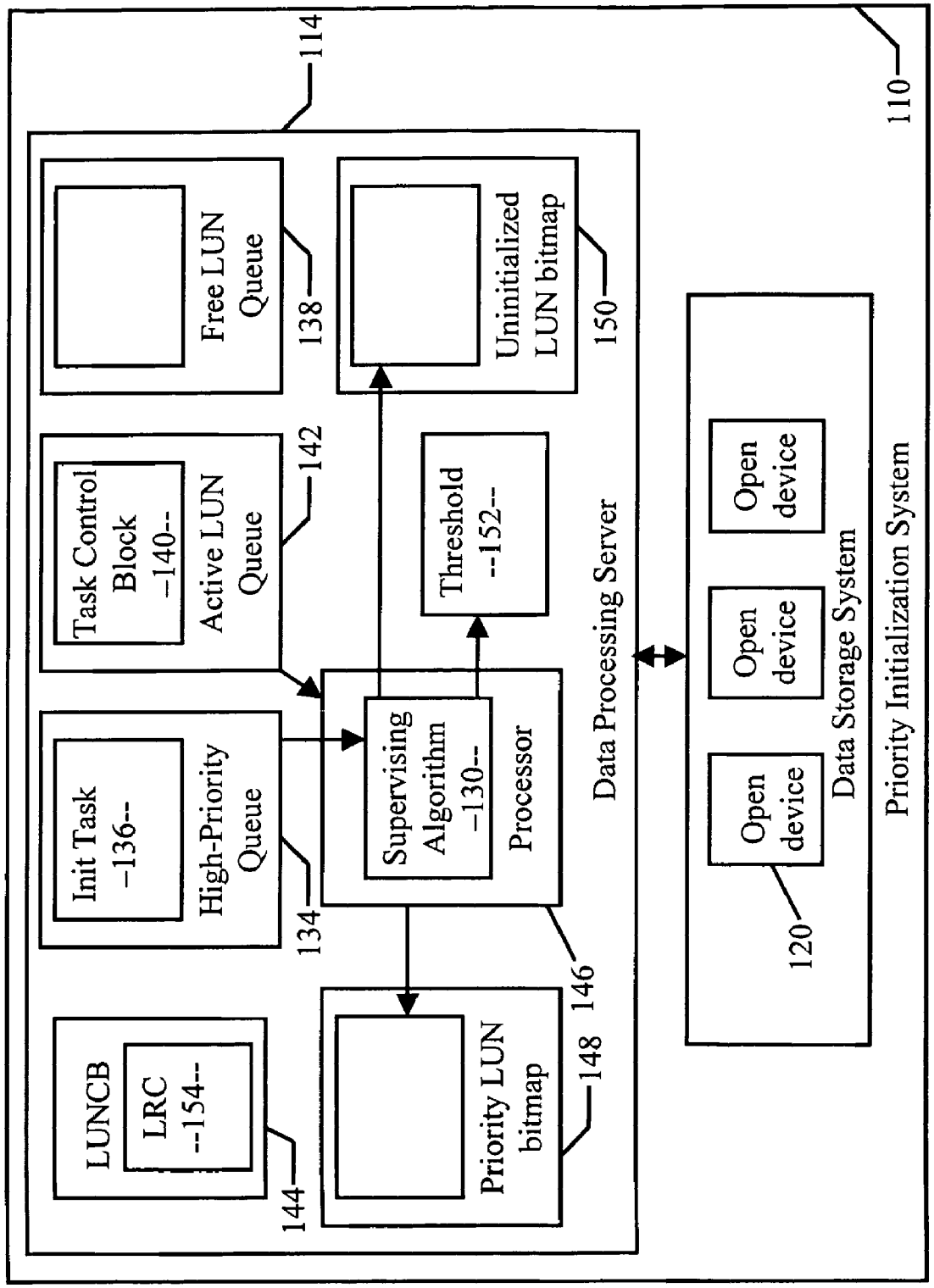
FIG. 3 is a block diagram illustrating the supervisor algorithm and the initialization task algorithm of the priority initialization system of FIG. 2.

In one embodiment of the invention, as illustrated in FIG. 3, once a supervisor algorithm 130 is invoked, it obtains a supervisor lock. Once the lock has been obtained, the supervisor algorithm 130 checks a priority LUN bitmap 148. The priority LUN bitmap 148 contains new LUNs corresponding to open devices 120 that should be initialized. If the priority LUN bitmap 148 is empty, the supervisor algorithm 130 checks the uninitialized LUN bitmap 150 for LUNs corresponding to open devices 120 that have not yet been initialized. Once a LUN is found that needs initializing, as determined by examining either the priority LUN bitmap 148 or the uninitialized LUN bitmap 150, the free init queue 138 is examined to determine if any TCBs 140 are available for use. If found, the TCB 140 is moved to the active init queue 142, as previously indicated.

If no TCBs are found in the free init queue, the number of TCBs 140 in use is compared to a maximum LUN init TCB threshold ("max threshold") 152. If the number of TCBs is below the max threshold, a new TCB is allocated. Otherwise, the supervisor algorithm suspends until a TCB is placed back in the free init queue 138. The free or newly allocated TCB is then placed in the active init queue 142 and the init task 136 is placed in the high-priority queue 134.

The init task 136 is an algorithm that performs the actual work of initializing open devices. If the supervisor algorithm 130 was invoked by an IML event, then the init task simply initializes the requested open device 120 and terminates. However, if the supervisor algorithm was invoked by a warmstart procedure, a logical redundancy check field ("LRC field") must be checked to make sure that the LUNCB 144 was not accidentally modified. If so, the corresponding open device 120 is re-initialized. Otherwise, the init task terminates without initializing the open device.

Figure 4:
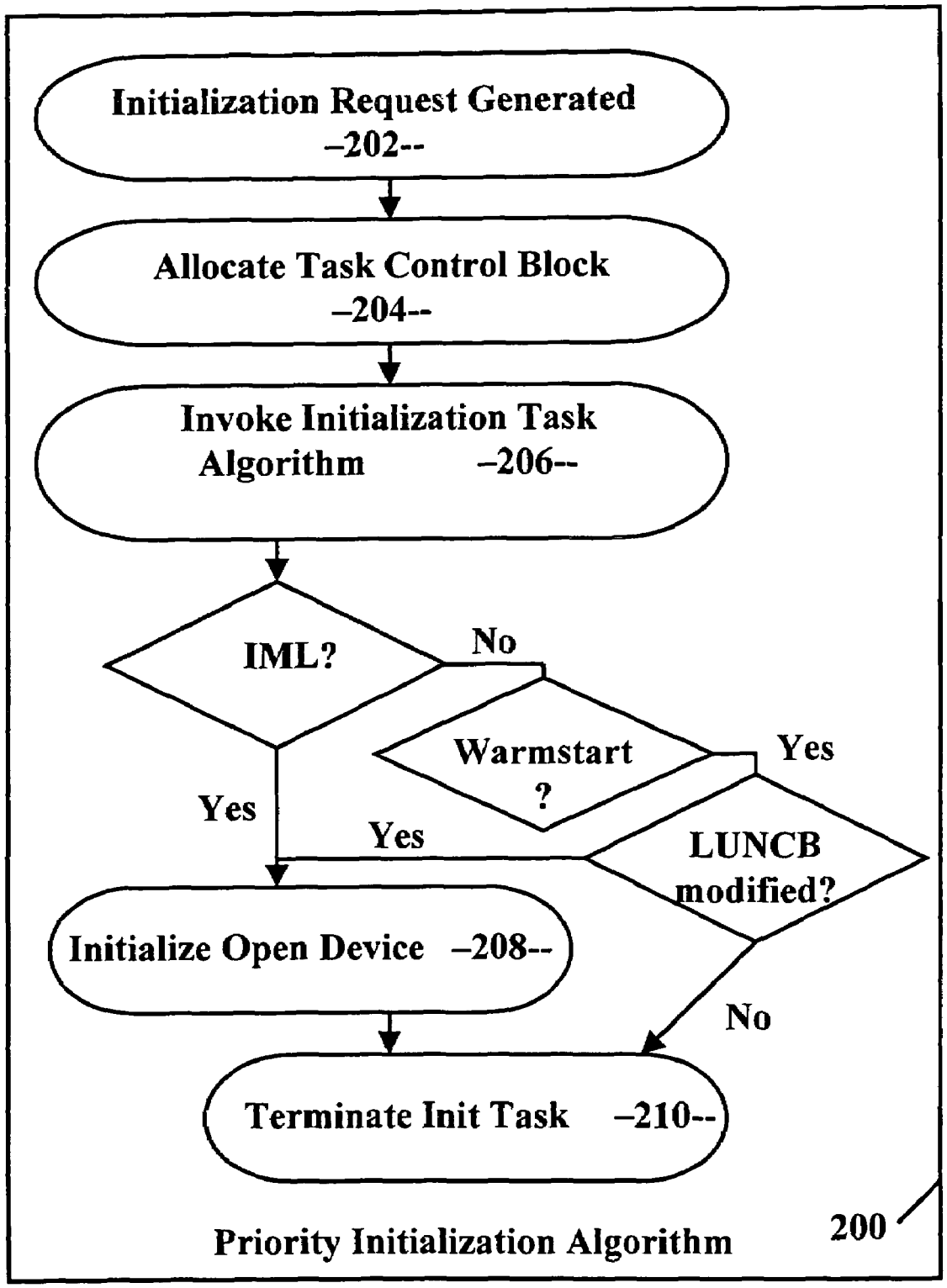
FIG. 4 is a flow chart illustrating a priority initialization algorithm according to the invention.

A priority initialization algorithm 200 is illustrated by the flow chart of FIG. 4. In step 202, an initiator 26 (FIG. 1) issues a request for an open device 120 that has not yet been initialized, invoking the supervisor algorithm 130. The supervisor algorithm allocates a task control block in step 204 and invokes the init task 136 in step 206. If the supervisor algorithm was invoked during an IML event, the init task 136 initializes the requested open device 120 in step 208 and terminates in step 210.

However, if the supervisor algorithm was invoked during a warmstart procedure, the LRC field is examined to determine if the LUNCB 144 (FIG. 2) is still valid. If so, the init task terminates in step 210. Otherwise, the requested open device 120 is initialized in step 208 and the init task terminates in step 210.

Those skilled in the art of making computer storage systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A priority initialization system, comprising:
   a plurality of data storage devices; and
   a data processing server in communication with said plurality of data storage devices and a plurality of host computers, said data processing server including a supervisor algorithm adapted to detect at least one of the plurality of host computers logging in to the data processing server, to identify a first set of the plurality of data storage devices that are associated with said at least one of the plurality of host computers and that have not been initialized, and to tag said first set of the plurality of data storage devices as having initialization priority.

2. The priority initialization system of claim 1, wherein the data processing server further includes an initialization algorithm adapted to initialize each of the first set of the plurality of data storage devices.

3. The priority initialization system of claim 1, wherein the data processing server further includes an initialization algorithm adapted to initialize each of the first set of the plurality of data storage devices, if the supervisor algorithm is invoked during an initial microcode load ("IML").

4. The priority initialization system of claim 1, wherein the data processing server further includes a plurality of logical unit number control blocks ("LUNCBs"), each of said LUNCBs corresponding to one of the first set of the plurality of data storage devices, each of said LUNCBs including a logical redundancy check field ("LRC field").

5. The priority initialization system of claim 4, wherein the data processing server further includes an initialization algorithm adapted to initialize one of the first set of the plurality of data storage devices if its corresponding LRC field indicates that its corresponding LUNCB has been erroneously modified.

6. The priority initialization system of claim 4, wherein the data processing server further includes an initialization algorithm adapted to not initialize one of the first set of the plurality of data storage devices if its corresponding LRC field indicates that its corresponding LUNCB has not been erroneously modified.

7. A method of initializing data storage devices comprising the steps of:
   detecting at least one of a plurality of host computers logging in to a data processing server;
   identifying a first data storage device that is associated with said at least one of a plurality of host computers and that has not been initialized; and
   giving initialization priority to the first data storage device.

8. The method of claim 7, further comprising the step of initializing the first data storage device.

9. The method of claim 7, further comprising the step of initializing the first data storage device if said initialization step is invoked during an initial microcode load ("IML").

10. The method of claim 7, wherein the data processing server further includes a logical unit number control block ("LUNCB") corresponding to the first data storage device, and said LUNCB includes a logical redundancy check field ("LRC field").

11. The method of claim 10, further comprising the step of initializing the first data storage device if its corresponding LRC field indicates that its corresponding LUNCB has been erroneously modified.

12. The method of claim 10, further comprising the step of not initializing the first data storage device if its corresponding LRC field indicates that its corresponding LUNCB has not been erroneously modified.

13. An article of manufacture including a data storage medium, said data storage medium including a set of machine-readable instructions that are executable by a processing device to implement an algorithm, said algorithm comprising the steps of:
   detecting at least one of a plurality of host computers logging in to a data processing server;
   identifying a first data storage device that is associated with said at least one of a plurality of host computers and that has not been initialized; and
   giving initialization priority to the first data storage device.

14. The article of manufacture of claim 13, further comprising the step of initializing the first data storage device.

15. The article of manufacture of claim 13, further comprising the step of initializing the first data storage device if said initialization step is invoked during an initial microcode load ("IML").

16. The article of manufacture of claim 13, wherein the data processing server further includes a logical unit number control block ("LUNCB") corresponding to the first data storage device, and said LUNCB includes a logical redundancy check field ("LRC field").

17. The article of manufacture of claim 16, further comprising the step of initializing the first data storage device if its corresponding LRC field indicates that its corresponding LUNCB has been erroneously modified.

18. The article of manufacture of claim 16, further comprising the step of not initializing the first data storage device if its corresponding LRC field indicates that its corresponding LUNCB has not been erroneously modified.

* * * * *